Feb. 24, 1970 C. C. BROWN 3,497,001

TUBING ANCHOR AND DRAIN ASSEMBLY

Filed Oct. 22, 1968 7 Sheets-Sheet 1

CICERO C. BROWN
INVENTOR.

BY

ATTORNEY

CICERO C. BROWN
INVENTOR.

BY [signature]

ATTORNEY

Feb. 24, 1970 C. C. BROWN 3,497,001

TUBING ANCHOR AND DRAIN ASSEMBLY

Filed Oct. 22, 1968 7 Sheets-Sheet 3

CICERO C. BROWN
INVENTOR.

BY

ATTORNEY

TUBING ANCHOR AND DRAIN ASSEMBLY

Filed Oct. 22, 1968

CICERO C. BROWN
INVENTOR.

BY

ATTORNEY

TUBING ANCHOR AND DRAIN ASSEMBLY

Filed Oct. 22, 1968 7 Sheets-Sheet 5

CICERO C. BROWN
INVENTOR.

BY [signature]

ATTORNEY

Feb. 24, 1970 C. C. BROWN 3,497,001

TUBING ANCHOR AND DRAIN ASSEMBLY

Filed Oct. 22, 1968 7 Sheets-Sheet 6

CICERO C. BROWN
INVENTOR.

BY

ATTORNEY

TUBING ANCHOR AND DRAIN ASSEMBLY

CICERO C. BROWN
INVENTOR.

BY

ATTORNEY 3,497,001
TUBING ANCHOR AND DRAIN ASSEMBLY
Cicero C. Brown, % Brown Oil Tools, Inc.,
P.O. Box 19236, Houston, Tex. 77024
Continuation-in-part of application Ser. No. 671,318, Sept. 28, 1967. This application Oct. 22, 1968, Ser. No. 769,528
Int. Cl. E21b *23/06, 23/04*
U.S. Cl. 166—120 5 Claims

ABSTRACT OF THE DISCLOSURE

A tubing anchor and drain assembly for installation in pump tubing strings employed in a well. The assembly includes hydrostatic pressure-actuated anchor elements and valve means operable by relative longitudinal movement and rotation of parts to open and close ports for draining the fluid column from the tubing string and releasing the anchor elements. The assembly also includes auxiliary back-up means operable to permit reclosing said valve means without requiring removal of the tubing string from the well for this purpose.

This application is a continuation-in-part of my copending application Ser. No. 671,318, filed Sept. 28, 1967, now U.S. Patent No. 3,448,805.

In the foregoing copending application, a tubing anchor is disclosed which employs anchor elements actuated by hydrostatic pressure in the tubing string to anchor the tubing to a surrounding casing, and which includes valve means operable by relative rotation between the parts of the assembly for opening drain ports through which the fluid column is drained from the tubing, while releasing the anchor elements. The valve means employed in this anchor assembly, when operated to open the drain passages and release the anchor elements, does not include any means enabling reclosing the valve without removing the tubing string from the well.

The present invention is directed to improvements in tubing anchors, such as disclosed in the aforementioned application, and more particularly in the provision of an auxiliary back-up means operable to engage the surrounding casing, so as to permit manipulation of the tubing string in place in the well to reclose the drain passages, thereby greatly simplifying the operations involved when it is necessary to pull the sucker rod string and pump from the tubing string for repair or replacement.

Other and more specific objects and advantages of this invention will become more readily apparent from the following detailed description when read in conjunction with the accompanying drawing which illustrates useful embodiments in accordance with this invention.

In the drawing:

FIGS. 1A and 1B, together, comprise a longitudinal, quarter-sectional view of an anchor assembly in accordance with one embodiment of this invention, the parts of the assembly being shown in the positions occupied when the device is being installed in a well casing;

Figure 1A:
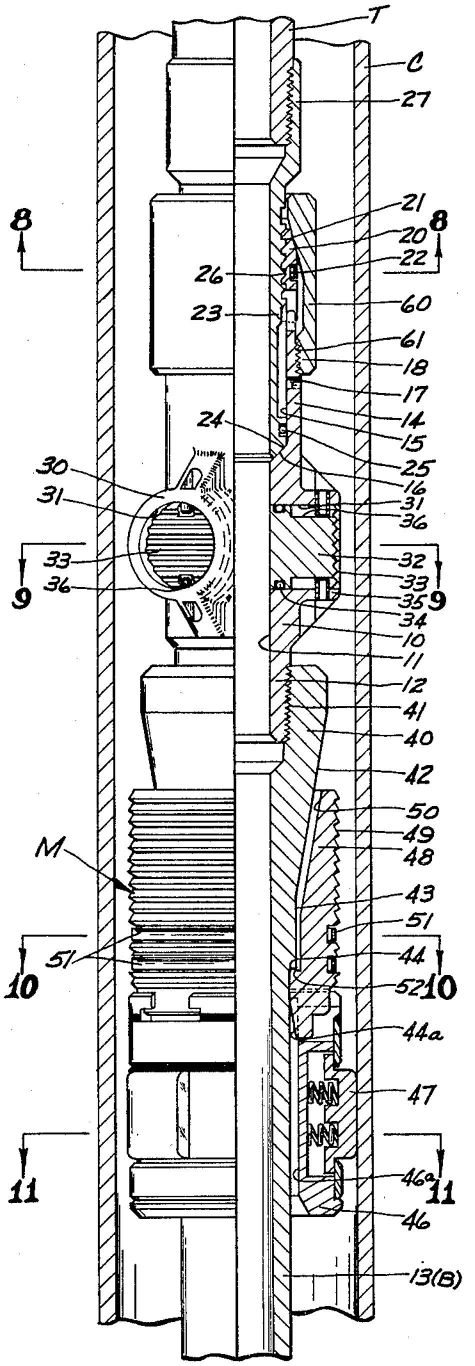
Figure 3:
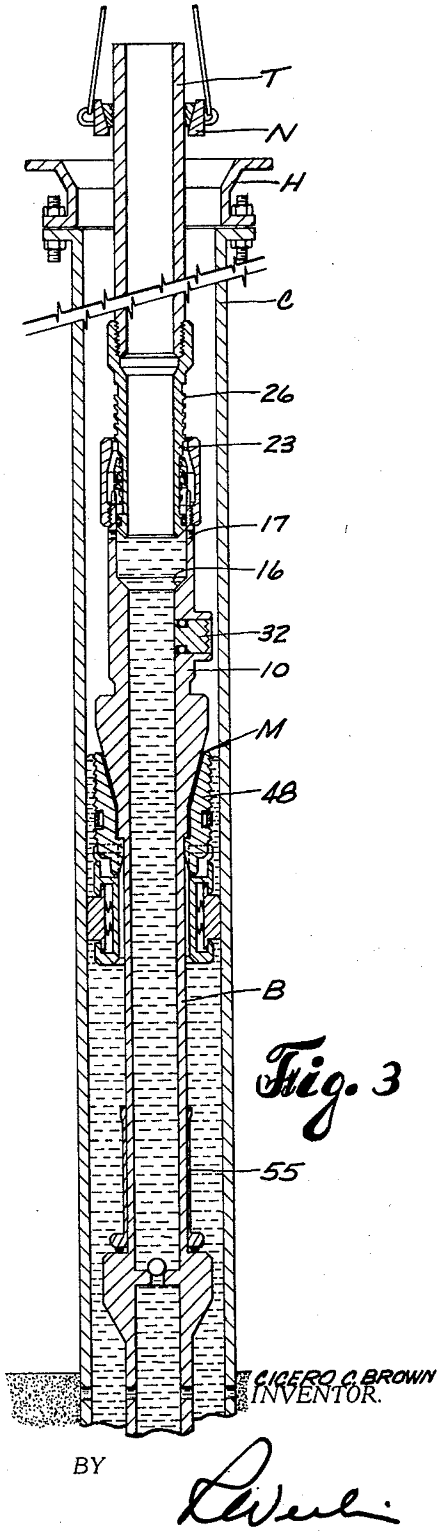
FIG. 3 is a view generally similar to FIG. 2, showing the parts in the released position with the drain passages open and the sucker rod string and pump removed.
Figure 12A:
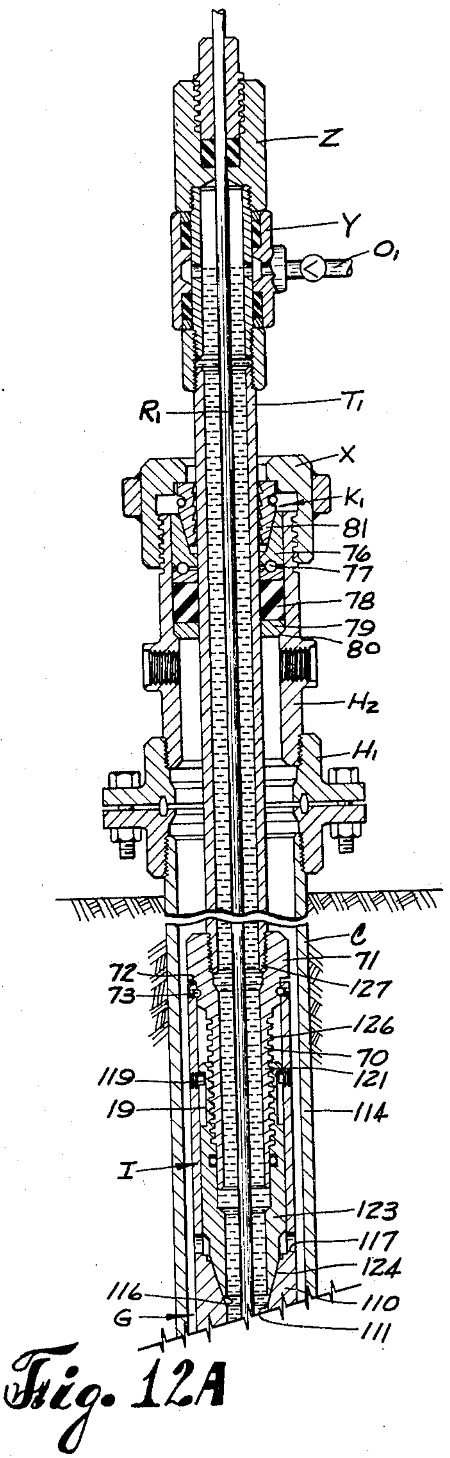
Figure 12B:
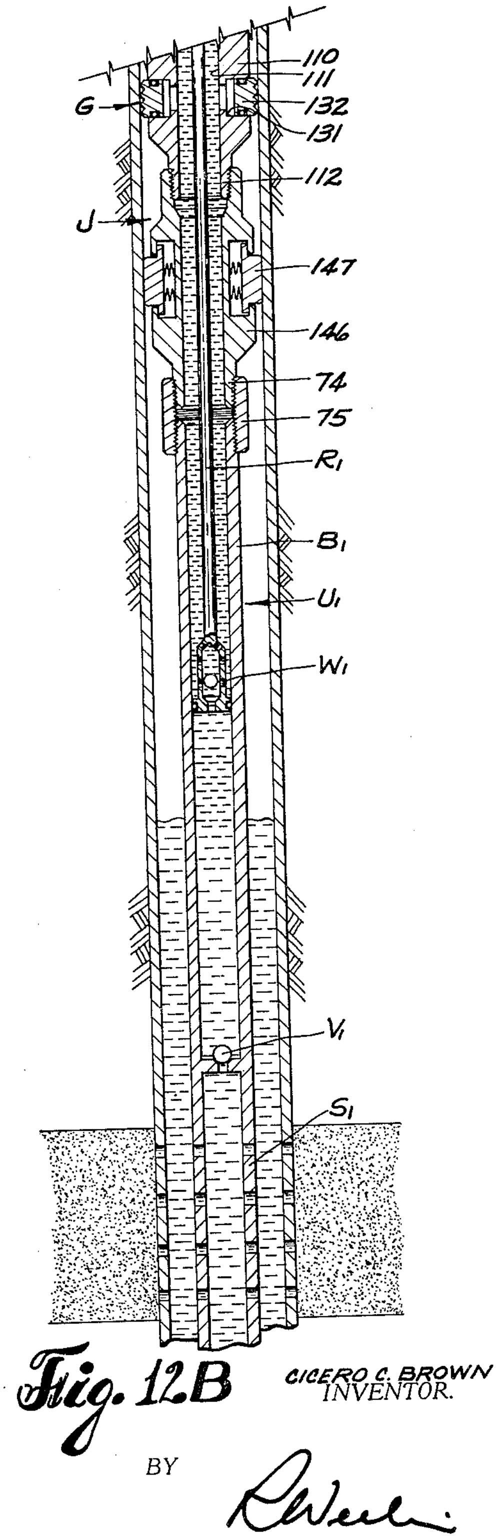
Figure 13A:
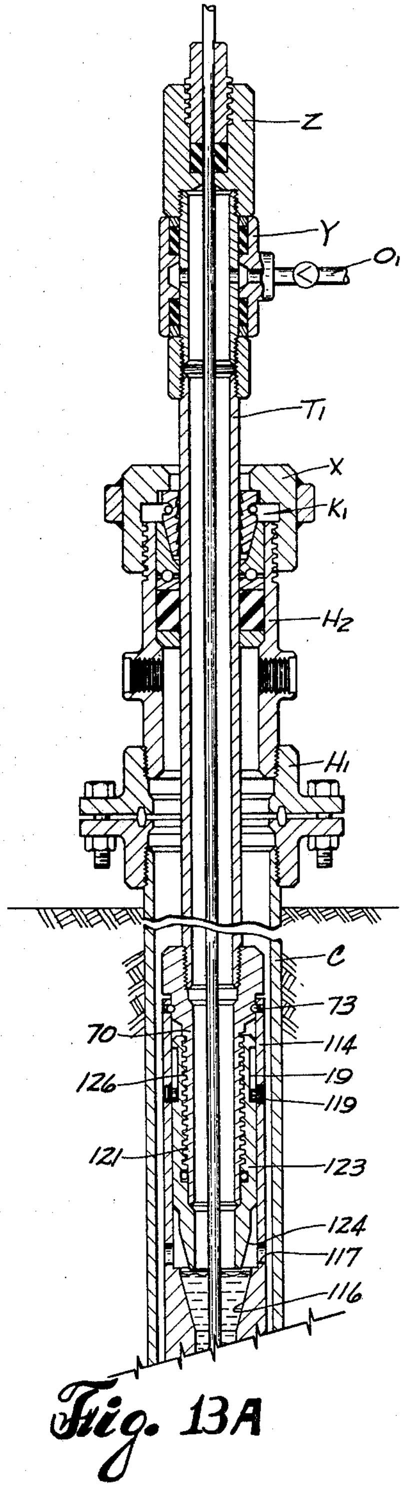
Figure 13B:
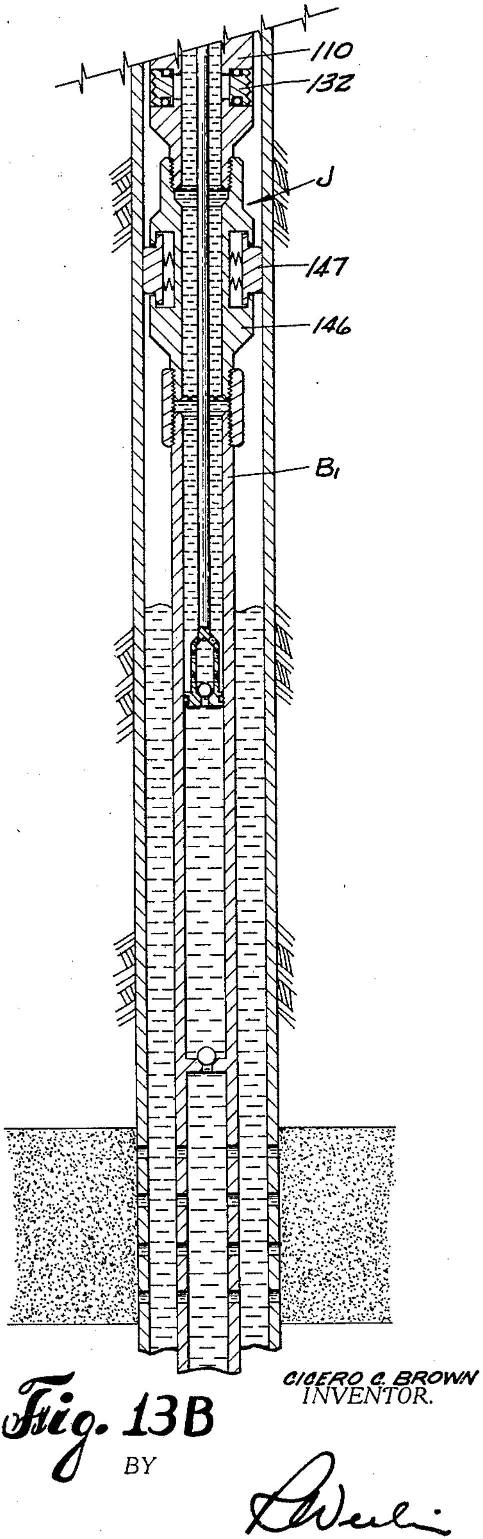

FIGS. 4 to 7, inclusive, are views generally similar to FIG. 3, showing several stages in the manipulation of the tubing string for actuating the back-up means and reclosing the drain passages;

FIGS. 8 to 11, inclusive, are cross-sections taken respectively on lines 8—8, 9—9, 10—10, and 11—11 of FIG. 1A;

FIGS. 12A and 12B, together, comprise a longitudinal sectional view illustrating a modification of the anchor assembly in accordance with this invention, showing the primary anchor elements in actuated position; and FIGS. 13A and 13B comprise a view generally similar to FIGS. 12A and 12B, showing the anchor and drain elements in the released positions.

Figure 1B:
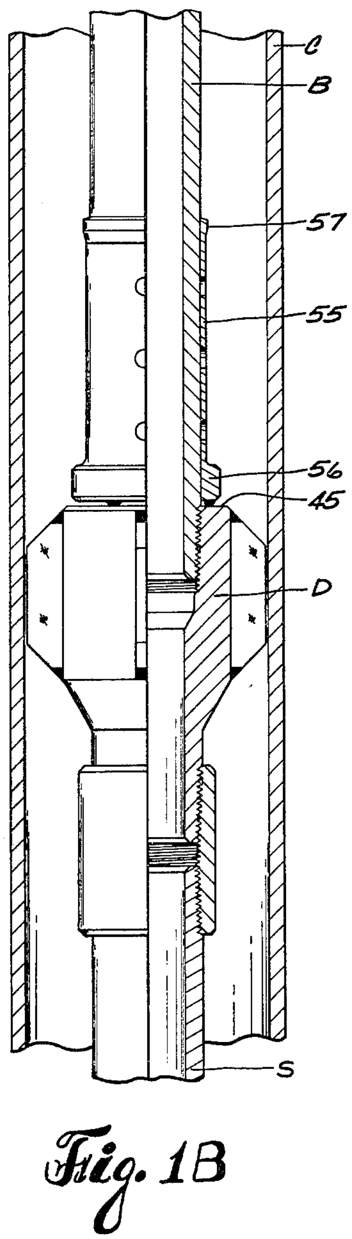
Figure 2:
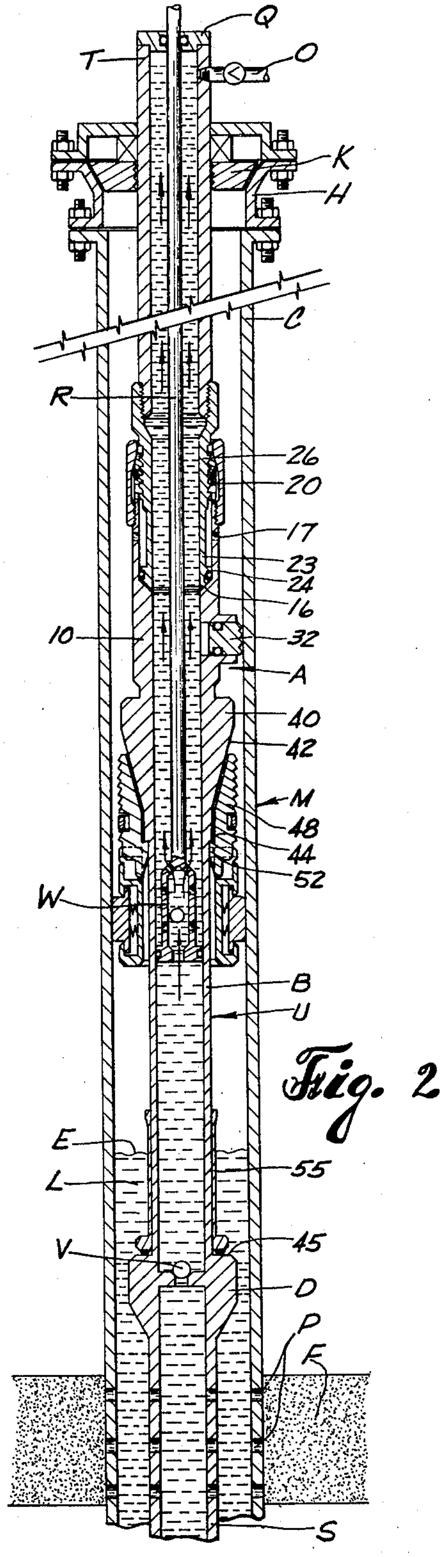
FIG. 2 is a longitudinal, sectional view showing the anchor assembly installed in a tubing string within a well with the primary anchor elements actuated and the drain passages closed.

Referring first to FIGS. 1 to 11, inclusive, and more particularly to FIG. 2, there is shown an assemblage of apparatus for equipping a pumping well which includes the device in accordance with one embodiment of this invention. As seen in these figures, a well casing C extends through an earth formation F, with which the casing is in communication by means of perforations P through which production fluids L, particularly oil, water, or both, enter casing C and rises therein to a level indicated at E. The top of the casing is equipped with the usual casing head H through which extends a string of production tubing T supported on a tubing head K and having a valved side outlet O.

The lower end of tubing string T has connected thereto an anchor assembly, designated generally by the letter A, the lower end of which is connected to a pumping unit, designated generally by the letter U, of any suitable and generally conventional design. As illustrated, the pumping unit is shown as an integral part of the lower end of the anchor assembly, but it will be understood that this will ordinarily be separably connected into the pipe string and anchor assembly. For illustrative purposes, the pumping unit comprises a tubular barrel B, the lower end of which defines a perforate screen S which extends into the body of fluid L. A centralizer D, of any conventional form, is shown mounted about barrel B. A conventional standing valve V is positioned in the bore of barrel B above screen S. A working valve or plunger W is mounted in barrel B above the standing valve for reciprocation by means of a string of sucker rods R which extends through a cap Q at the upper end of the tubing string for connection to the usual walking beam or other conventional power-operated reciprocating device (not shown). A back-up assembly, designated generally by the letter M, is mounted about pumping unit U below anchor assembly A.

The details of anchor assembly A, as best seen in FIGS. 1A and 1B, comprises a tubular cage 10 having an axial bore 11 and an externally threaded pin 12 at its lower end for threaded connection to the upper end of a tubular extension 13, which may be a portion of barrel B as well as of back-up anchor assembly M. Cage 10 is provided with an upwardly extending tubular extension 14 having a bore 15 larger in diameter than bore 11 to define an upwardly facing bevelled seat 16. At a point above seat 16 extension 14 is provided with one or more radial ports 17 above which is provided a section of external threads 18. The upper end of extension 14 is formed to provide a split nut 20 having ratchet-type threads 21, the nut segments being resiliently biased inwardly by means of a spring 22, and is confined by a collar 60, the lower end of which has internal threads 61 for engaging threads 18. Extending through collar 60 into bore 15 is a sleeve valve 23, the lower end of which has a bevelled tip 24 adapted to seat on seat 16. A seal ring 25 is mounted in the exterior of tip 24 to slidably seal with the wall of bore 15 at a point below port 17 when sleeve valve 23 is fully inserted in bore 15. Valve sleeve 23 carries a section of ratchet threads 26 at a point such that when sleeve valve 23 is fully inserted in bore 15 ratchet threads 26 will be engaged by segmented nut 20. The upper end of sleeve valve 23 terminates in an internally threaded box 27 adapted to connect assembly A to the lower end of tubing T. Ratchet threads 26 and threads 21 on nut 20 are left-hand threads, so that rotation of the tubing string and sleeve valve 23 in the right-hand direction will tend to retract sleeve 23 from nut 20, whereby to raise the sleeve valve to a point at which seal 25 and nose 24 will be above port 17. Engagement of the threads will be effected simply by moving sleeve valve 23 downwardly to ratchet threads 26 through the segments of nut 20. As will be evident, valve sleeve 23 and its related elements, in addition to controlling ports 17, also function as a portion of an upper connection means by which the upper end of cage body 10 is connected to the upper portion of the tubing string. Pin 12 functions as a lower connection means for connecting the cage body to sub-adjacent portions of the tubing string and the apparatus supported thereon.

Cage 10 carries a plurality (three in the illustrative embodiment) of angularly spaced, radially extending tubular bosses 30 having cylindrical bores or cylinders 31 in each of which is radially slidably mounted a button-type, generally cylindrical pipe-gripping slip 32 having a toothed outer end face 33 for grippingly engaging the surrounding casing C when urged outwardly of cylinders 31 against the casing. The inner ends of slips 32 carry seal rings 34 in their outer peripheries for slidable sealing engagement with the walls of cylinders 31, allowing the slips to function as pistons in the latter. Pairs of stop lugs 35 project through opposite points of the walls of bosses 30 into longitudinal slots 36 provided in the periphery of slips 32 for engagement by the inner end walls of the slots to prevent expulsion of the slips from the cylinders.

Back-up assembly M includes an expander section 40 which, as illustrated, may form the upper end of extension 13 and has an internally threaded socket 41 adapted to receive pin 12. Expander 40 has a downwardly tapering, generally conical expander surface 42 which merges with a generally cylindrical section 43, the lower end of which defines the downwardly facing undercut shoulder 44 about extension 13. The lower end of extension 13, or barrel B as the case may be, is externally threaded for reception in tubular centralizer D, the upper end of which defines an upwardly facing shoulder 45. Mounted about extension 13 for relatively sliding movement thereon is a cage 46 which carries a plurality of angularly spaced, spring-pressed wiper blocks 47 adapted to frictionally engage the surrounding casing C. The upper end of cage 46 supports a plurality of pipe-gripping slips 48 having toothed outer faces 49 and tapered inner faces 50 adapted to cooperate with expander surface 42 for moving slips 48 radially outwardly into gripping engagement with casing C in response to relative longitudinal movement between the slips and the expander. Slips 48 are normally held inwardly in their retracted position by means of annular springs 51. The inner faces of slips 48, near their lower ends, merge into an upwardly facing annular shoulder 52 adapted to be engaged beneath shoulder 44, as shown in FIG. 1, when the slips are in their retracted position. The inner surface of the slip shanks below shoulders 44 taper downwardly and outwardly to define guide surfaces **44*a*. Cage 46 has an axial bore 46*a* larger in diameter than the exterior of extension 13 and the clearance thus provided about extension 13 is adapted to admit a releasing sleeve 55 slidably mounted on extension 13 and adapted, when not actuated, to rest on shoulder 45. The lower end of sleeve 55 carries an annular enlargement 56 limiting the extent of its entrance into annular space 46*a* and its upper end terminates in an upwardly tapering enlargement 57 dimensioned to pass through annular space 46*a* and engage guide surface 44*a* to urge the slips radially outwardly for effecting release of slips 48** in the operation of the device, as will be described subsequently.

OPERATION

Referring first to FIG. 2, the assemblage of apparatus is shown installed in a well in operative condition, with anchor slips 32 engaging casing C and back-up slips 48 of back-up assembly M in their retracted position. The fluid column inside the tubing T is at an elevation such that the hydrostatic pressure has actuated slips 32 to grip casing C and anchor the assembly therein to permit reciprocation of the pumping string, while keeping the assemblage stationary.

When it is desired to perform some work on the pumping string the tubing string will be supported in elevators V and tubing hanger K removed (FIG. 3). The tubing string will be rotated to unscrew threads 26 on valve sleeve 23 from nut segments 20, thereby retracting valve sleeve 23 a distance sufficient to open ports 17, whereby to allow the fluid column in the tubing above ports 17 to drain into the casing annulus. The removal of the hydrostatic head from slips 32 in this manner will free the latter for retraction from engagement with casing C. At this stage of the operations back-up assembly M will remain in its non-actuated condition, also as seen in FIG. 3. With the fluid column drained from the tubing, the pumping string may now be pulled from the tubing.

Figure 4:
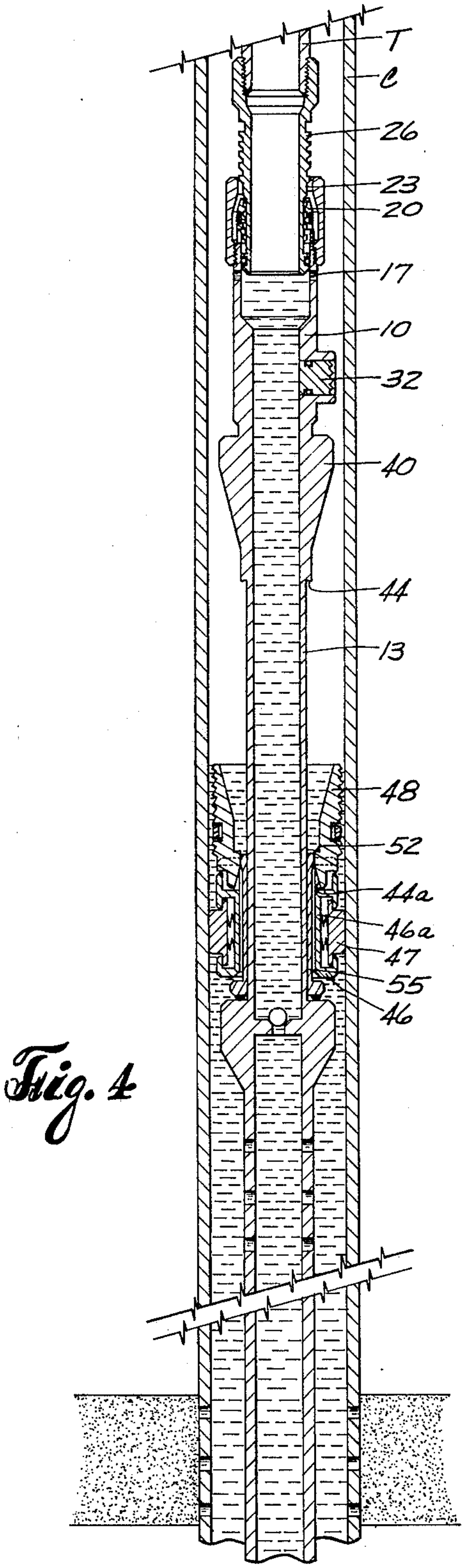

In order to reclose ports 17 by reinserting sleeve valve 23, it is necessary to hold the lower portion of the tubing string carrying cage 10 against longitudinal movement in order to accomplish the re-connection of threads 26 and nut 20. To accomplish this, the back-up assembly is now operated by a sequence of steps illustrated in FIGS. 4 to 6. In the first step of this sequence of operations the entire tubing string is lifted relative to cage 46 of the back-up assembly, slips 48 being held stationary by the frictional engagement of wiper blocks 47 with the casing. The extent of upward movement of the tubing string will be such as to move releasing sleeve 55 through annular space **46*a* to bring enlargement 57 into expansive engagement with tapered guide surfaces 44*a* of the slips, urging the latter outwardly sufficiently to permit shoulders 52 to clear shoulder 44, the latter at this stage being well elevated above shoulder 54**, as seen in FIG. 4.

Figure 5:
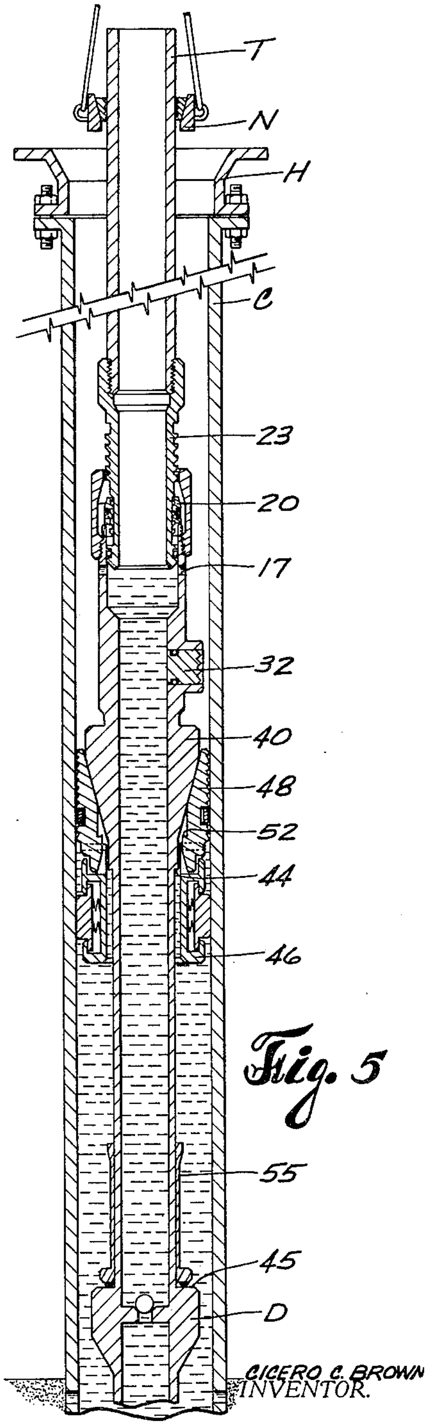
Figure 6:
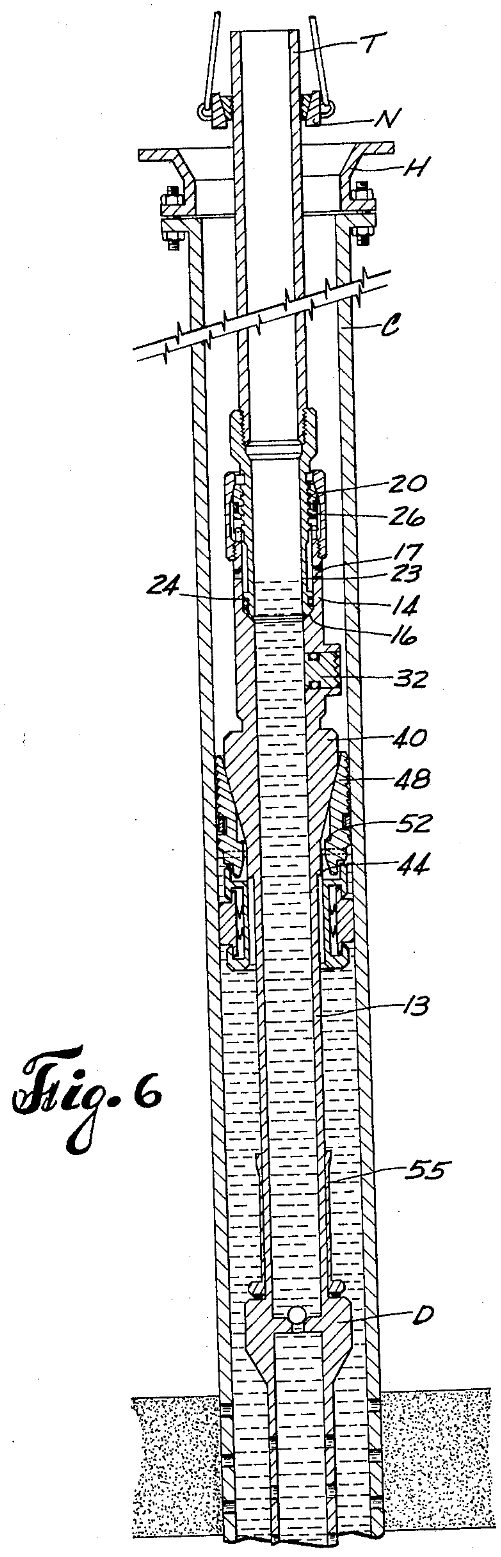

In the next stage, the tubing string is lowered through releasing sleeve 55, the latter remaining in place inside cage 46 until shoulder 44 passes below shoulders 52 of the back-up slips as seen in FIG. 5. When this occurs, sleeve 55 will be released and will slide back down extension 13 to its original position on shoulder 45 of centralizer D. This operation will allow expander 40 to move downwardly inside slips 48 and wedge the latter outwardly into gripping engagement with casing C, as seen in FIG. 5. At the completion of this stage of operations, the back-up assembly will now anchor the tubing string to the casing while sleeve valve 23 is still in its retracted position, ports 17 being open and anchor slips 32 still retracted.

With the back-up assembly actuated and supporting the tubing string against further downward movement by reason of engagement of expander 40 with slips 48, the upper portion of the tubing string will, substantially simultaneously with the setting of slips 48, move downwardly relative to the anchored portion of the string sufficiently to lower sleeve valve 23 into its lowermost position in cage extension 14, closing off ports 17 and re-engaging nut 20 with ratchet threads 26.

Figure 7:
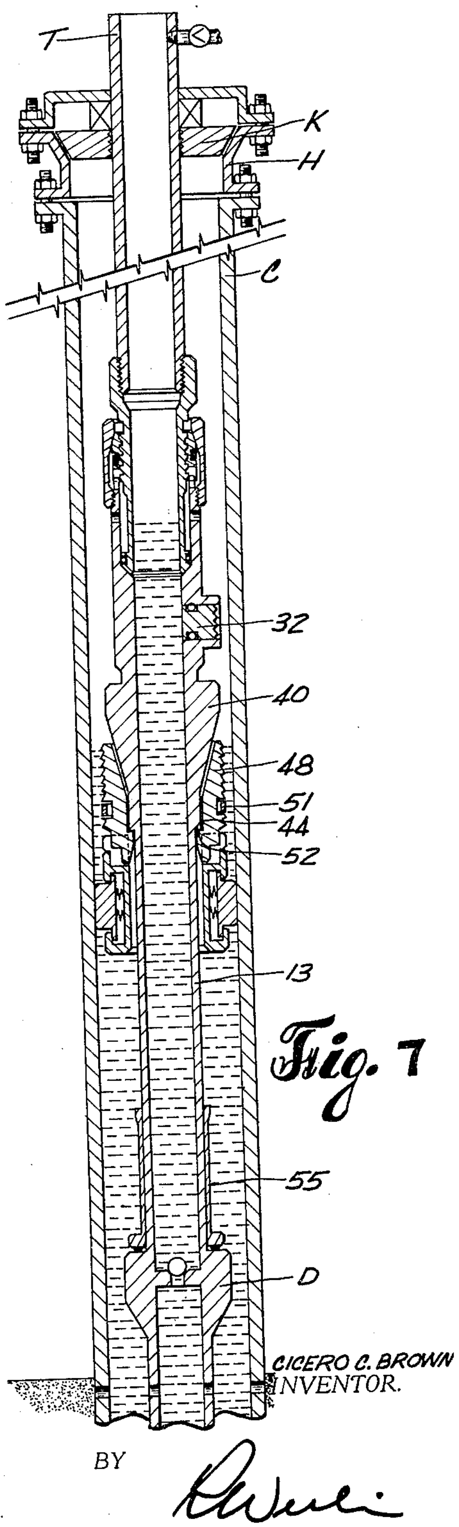
Figure 8:
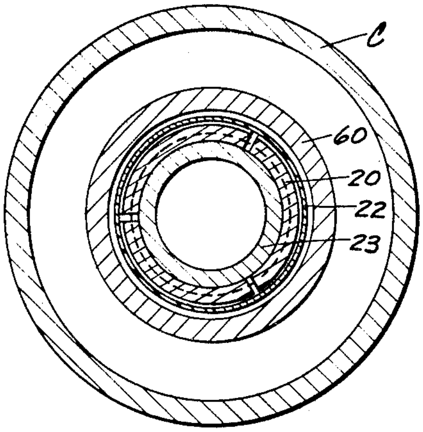
Figure 10:
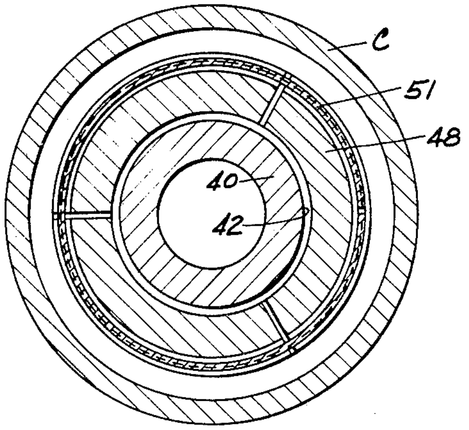
Figure 9:
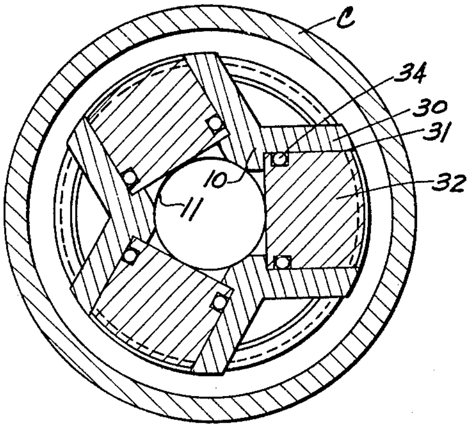
Figure 11:
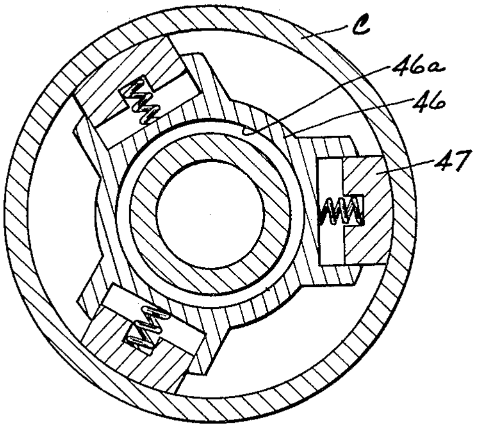

The next stage illustrated in FIG. 7, merely involves raising tubing string T a slight amount sufficient to raise expander 40 out of back-up slips 48, allowing the latter to be retracted by springs 51 and re-engaging slip shoulders 52 beneath shoulder 44, thereby returning the assemblage to the condition shown in FIGS. 1A and 1B. The tubing hanger K will now be replaced in casing head H to support the tubing string in the position shown in FIG. 7. Thereupon, the pump W and the sucker rod string R may be replaced in the tubing and upon a few strokes of the pump, the level of the fluid column in the tubing will be raised to a sufficient height such that slips 32 will again be actuated by the hydrostatic head to engage casing C and re-anchor the tubing string to the casing.

With the foregoing arrangement, it will be seen that the tubing anchor and drain valve may be released and re-actuated as frequently as desired without requiring the removal of the tubing string from the well in order to accomplish this operation.

FIGS. 12A to 13B illustrate a modification of the assemblage heretofore described, the differences being more particularly in the form of the sleeve valve for controlling the drain passages and in the arrangement and location of the back-up elements.

In this modification, the anchor assembly, designated generally by the letter G, is connected at its upper end by an upper connector assembly, designated generally by the letter I, into tubing string $T_1$ and by its lower end to a back-up assembly, designated generally by the letter J, which is in turn connected to the pumping unit U, comprising the barrel $B_1$, screen $S_1$, standing valve $V_1$, working valve or plunger $W_1$, and sucker rod string $R_1$.

The upper portion of tubing string $T_1$ extends through a casing head $H_1$ surmounted by a tubing head $H_2$. A tubing hanger $K_1$ is mounted in tubing head $H_2$ which is closed about the tubing string by a screw cap X. Mounted on top of tubing string $T_1$ is a flow nipple Y which connects with valved outlet pipe $O_1$. The upper end of flow nipple Y is closed by a stuffing box Z through which sucker rod string $R_1$ is reciprocated.

Anchor assembly G comprises the tubular cage 110 having an axial bore 111 and cylindrical openings 131 communicating with the bore and receiving anchor slips 132, all of which may be substantially identical in detail with the corresponding elements of the previously described embodiment.

Upper connector assembly I includes the tubular extension 114 having a bore somewhat larger in diameter than bore 111 to define the downwardly tapering conical seat 116. Drain ports 117 extend radially through extension 114. A sleeve valve 123 is slidably mounted in the bore of extension 114 and is provided at its lower end with a bevelled tip 124 adapted to seal with seat 116 to close off communication between ports 117 and bore 111. The upper end portion of sleeve valve 123 is provided with a circumferential recess 19. A plurality of stop pins 119 project from extension 114 into recess 19. The length of the latter is made such that engagement of stop pins 119 with the opposite ends of the recess serves to limit the longitudinal movement of sleeve valve 123 between positions opening and closing ports 117. The upper portion of the bore of sleeve valve 123 is provided with a section of threads 121. A valve actuating sleeve 70 extends through the upper end of extension 114 into the bore of sleeve valve 123 and is provided with a section of external threads 126 engaged with threads 121. Threads 121 and 126 are left-hand threads so that rotation of actuating sleeve 70 in the right-hand direction will raise sleeve valve 123 to the port-opening position (FIG. 13A) and rotation in the oposite direction will move the sleeve valve to the port-closing position (FIG. 12A).

The upper end of actuating sleeve 70 carries an enlarged head 71 having an internally threaded box 127 for connecting the upper connector assembly I to the lower end of tubing $T_1$. Head 71 has a downwardly facing shoulder 72 which overhangs the upper end of extension 114 and anti-friction bearings 73 are mounted between shoulder 72 and the upper end of extension 114 to permit actuating sleeve 70 to rotate freely relative to extension 114 for purposes of raising and lowering sleeve valve 123.

The lower end of anchor cage 110 has a threaded pin 112 for connecting anchor cage 110 to a back-up cage 146 provided with a plurality of angularly spaced, spring-pressed wiper blocks 147 adapted to frictionally engage the surrounding casing C. The lower end of back-up cage 146 is provided with an externally threaded pin 74 for connecting the cage by means of a collar 75 to the upper end of pump barrel $B_1$.

Tubing hanger $K_1$ may be of any suitable or generally conventional design adapted to sealingly support the tubing string in the tubing head, while permitting rotation of the tubing string in the head. In the form illustrated, the hanger includes a slip bowl 76 rotatably disposed on a roller-type bearing 77 which is seated on a compressible packing ring 78 which is, in turn, supported on a base ring 79 resting on an internal shoulder 80 in the bore of the tubing head.

A plurality of pipe-gripping slips 81 are disposed in slip bowl 76 for wedging engagement thereby with the tubing string. Screw cap X is screwed down over the slips 81 to hold them in such wedging engagement but may be backed-off slightly to permit the slip bowl, slips and tubing $T_1$ to be rotated as required in operation of the device.

OPERATION OF MODIFIED ANCHOR

In the assemblages seen in FIGS. 12A and 12B, the several parts are shown in the positions occupied when the anchor is actuated to permit operation of the pumping string. Valve tip 124 is seated in seat 116 closing off communication to drain ports 117.

FIGS. 13A and 13B show sleeve valve 123 in the port-open position. To attain this position, cap X will have been backed-off sufficiently to allow tubing $T_1$ to be turned freely. Rotation of the tubing string in the right-hand direction will rotate actuating sleeve 70 causing sleeve valve 123 to raise to the port-open position by reason of the co-action of left-hand threads 121 and 126. Anchor cage 110 and its connected parts will be held stationary by back-up assembly J by reason of the frictional engagement between wiper blocks 147 and casing C to thereby permit the relative rotation of actuating sleeve 70. The column of fluid above anchor slips 132 will drain into the well through ports 117 and the pump and rod string may be withdrawn, as may be required.

To re-actuate the tubing anchor, it is only necessary to rotate tubing string $T_1$ in the left-hand direction, this reverse rotation being transmitted to actuating sleeve 70 for returning sleeve valve 123 to the port-closing position. Back-up assembly J will continue to hold the anchor body stationary while the actuating sleeve engages in the required relative rotation.

It will be understood that various other alterations and modifications may be made in the details of the illustrative embodiments within the scope of the appended claims but without departing from the spirit of this invention.

What I claim and desire to secure by Letters Patent is:

1. An anchor and drain device for well tubing strings, comprising:

(a) a tubular body;

(b) upper and lower connector means carried by the upper and lower ends of the body for connecting it into a tubing string to form a part thereof;

(c) a plurality of angularly-spaced radial openings in the wall of the body communicating with the bore thereof;

(d) pipe-gripping elements mounted in said openings for movement into anchoring engagement with a surrounding well pipe in response to hydrostatic pressure in the tubing string;

(e) drain passage means through the wall of said body communicating the bore of the body with the exterior thereof;

(f) sleeve valve means forming a part of said upper connector means operable by rotational and longitudinal movements of the tubing string portion above the body relative to said body to open and close said passage means; said sleeve valve means including:

(i) a tubular valve member connectible to said tubing string and insertible into the upper end of said body;

(ii) a seat in said body cooperating with the inner end of said valve member to seal off between the valve member and the wall of said body at a point below said drain passage means; and (iii) a left-hand thread ratchet-type connection between the valve member and said body engageable by longitudinal movement of the valve member relative to said body to close off said drain passage means, and releasable by right-hand rotation of the valve member relative to said body to retract said valve member to a position opening said drain passage means; and (g) back-up means carried by the body engageable with the surrounding casing to hold said body to enable said relative movements.

2. An anchor and drain device according to claim 1, wherein said back-up means comprises:

(a) a radially expansible pipe-gripping assembly actuatable by reciprocative movements of the tubing string to engage a surrounding well wall.

3. An anchor and drain device according to claim 1, wherein said back-up means comprises:

(a) a tubular cage slidably disposed about the lower end portion of said body; and (b) means carried by said cage for frictionally engaging a surrounding well wall.

4. An anchor and drain device for well tubing strings, comprising:

(a) a tubular body;

(b) upper and lower connector means carried by the upper and lower ends of the body for connecting it into a tubing string to form a part thereof;

(c) a plurality of angularly-spaced radial openings in the wall of the body communicating with the bore thereof;

(d) pipe-gripping elements mounted in said openings for movement into anchoring engagement with a surrounding well pipe in response to hydrostatic pressure in the tubing string;

(e) drain passage means through the wall of said body communicating the bore of the body with the exterior thereof;

(f) sleeve valve means forming a part of said upper connector means operable by rotational and longitudinal movements of the tubing string portion above the body relative to said body to open and close said passage means; said sleeve valve means including, (i) a tubular valve member axially slidable in the bore of said body;

(ii) a seat in said body cooperating with the inner end of said valve member to seal off between the valve member and the wall of said body at a point below said drain passage means;

(iii) an actuating sleeve connectible to said tubing string and extending into the bore of said valve member;

(iv) mating left-hand thread means on said actuating sleeve and said valve member operable to move said valve member between positions opening and closing said drain passage means in accordance with the direction of rotation of said actuating sleeve relative to said valve member; and (g) back-up means carried by the body engageable with the surrounding casing to hold said body to enable said relative movements.

5. An anchor and drain device according to claim 4, wherein said back-up means comprises:

(a) a tubular cage slidably disposed about the lower end portion of said body; and (b) means carried by said cage for frictionally engaging a surrounding well wall.

References Cited

UNITED STATES PATENTS

| | | | |
|---|---|---|---|
| 2,603,163 | 7/1952 | Nixon | 166—212 |
| 2,785,758 | 3/1957 | Baker | 166—212 |
| 3,020,959 | 2/1962 | Nutter | 166—212 |
| 3,112,796 | 12/1963 | Myers | 166—212 |
| 3,412,799 | 11/1968 | Ellis | 166—212 |

JAMES A. LEPPINK, Primary Examiner

U.S. Cl. X.R.

166—131, 134